O. WESTLING.
CAR MOVER.
APPLICATION FILED JUNE 19, 1919.

1,412,153.

Patented Apr. 11, 1922.

INVENTOR.
OLOF WESTLING.
BY HIS ATTORNEYS.
Williamson Merchant

UNITED STATES PATENT OFFICE.

OLOF WESTLING, OF MINNEAPOLIS, MINNESOTA.

CAR MOVER.

1,412,153.  Specification of Letters Patent.  Patented Apr. 11, 1922.

Application filed June 19, 1919. Serial No. 305,308.

*To all whom it may concern:*

Be it known that I, OLOF WESTLING, a citizen of the United States, residing at Minneapolis, in the county of Hennepin and State of Minnesota, have invented certain new and useful Improvements in Car Movers; and I do hereby declare the following to be a full, clear, and exact description of the invention, such as will enable others skilled in the art to which it appertains to make and use the same.

My invention has for its object to provide an improved car mover of a type wherein a lever is employed for action on a car wheel to move the car slowly from place to place. Car movers of this type are used in numerous places, such as around mills, factories, and the like, where it is frequently necessary to move a car on the track from one place to another. The improved car mover comprises, a fulcrum bracket and lever pivoted thereto. The fulcrum bracket is adapted to slide on the upper flange of a rail and to bite or grip the same, in the car moving action.

The invention is illustrated in the accompanying drawings wherein like characters indicate like parts throughout the several views.

Referring to the drawings.

Figure 1:
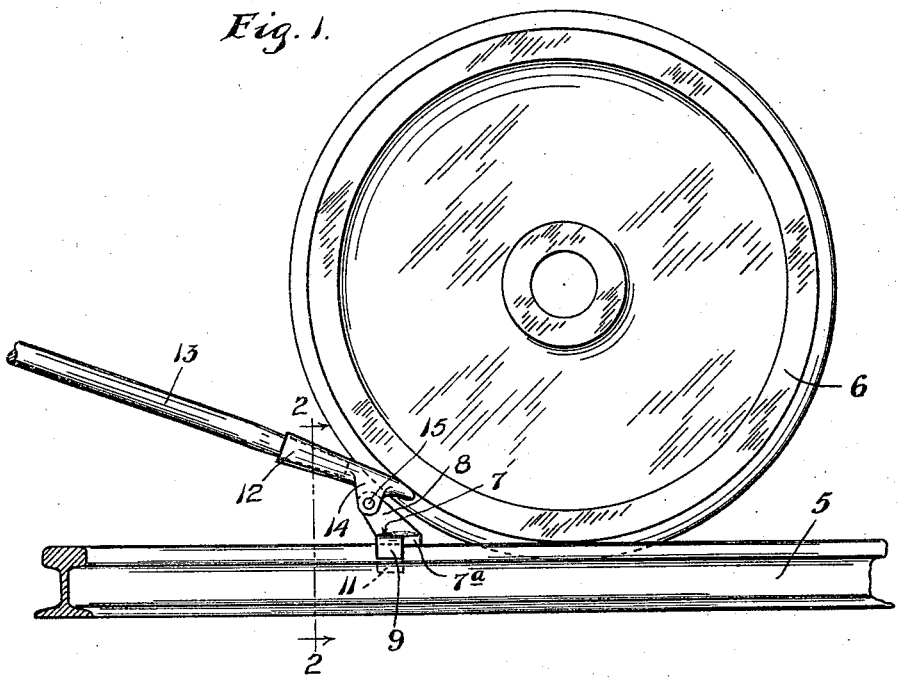
Fig. 1 is a side elevation showing my improved car mover applied to a rail to move a car, one of the wheels of the car being shown.
Figure 2:
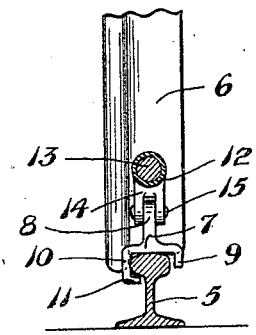
Fig. 2 is a section on the line 2—2 of Fig. 1, some parts being broken away.
Figure 3:
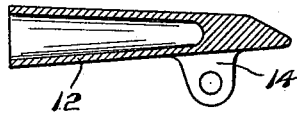
Fig. 3 is a vertical axial section of the metallic end or cap member of the operating lever.
Figure 4:
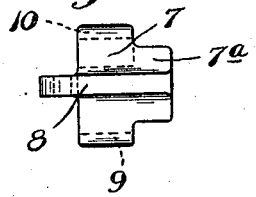
Fig. 4 is a plan view of the so-called fulcrum brackets.

The track rail is indicated by the numeral 5 and a car wheel by the numeral 6. The so-called fulcrum bracket comprises a base 7, having an upwardly and rearwardly projected fulcrum lug 8, and a forwardly projected rail engaging extension 7ª. At its sides, the base 7 has depending guide flanges 9 and 10, the latter of which is formed with an inturned lock flange 11. The lock flange 11 and guide flange 9 are so spaced, that the bracket can be applied to the upper flange of the rail by a sort of angular lateral rocking movement. When this bracket is thus applied, the lock flange 11 will underlie one of the upper flanges of the rail so that the bracket, when rocked rearward, will lock or grip itself on the flange of the rail. The lever or pinch bar is made up of a cast socket 12 and a long wooden handle bar 13. The socket 12, rearward of its front end is provided with depending lugs 14, which by a pin 15 are pivotally connected to the lug 8 of the fulcrum bracket 7. It is important to note that the pivot 15 is rearward of the lock flange 11, so that in the car moving action, downward pressure on the lever will cause the fulcrum brackets to tilt slightly rearward until the so-called lock flange 11, tightly grips the rail flange and thereby prevents slipping of the said fulcrum bracket on the rail.

When the device is applied as shown in Fig. 1 and the end of handle bar 13 is pressed downward, the short front end of the socket will press against the wheel and cause the wheel to rotate forward, thereby moving the car. When the car is moved forward, the fulcrum bracket may be slid forward on the rail so that the lever may again be engaged with the wheel; and under this forward sliding movement of the fulcrum bracket the forwardly projecting flange 7ª rides on the rail and prevents the fulcrum bracket from rocking forward, and hence prevents the lock flange 11 from gripping the rail flange.

This device, in actual practice, has been found highly efficient for the purposes had in view.

What I claim is:

1. A car mover comprising a bracket having a base portion provided with a flat surface adapted to engage throughout its entire length with the top surface of the rail, an upwardly and rearwardly inclined lug rising from said base portion and having a pivot opening therein disposed rearwardly of said base portion, a flange extending vertically downward from said base portion on the side of the rail having a projection adapted to extend under the rail head, a lever having a depending lug pivoted to said lug having a portion extending forwardly thereof, and a handle socket extending rearwardly thereof, and a handle secured in said socket.

2. A car mover comprising a bracket having a base portion provided with a flat surface adapted to engage throughout its length with the top surface of the rail, a lug extending upwardly and rearwardly from said base portion, and a flange extending vertically downward from said base portion having a projection adapted to engage under the head of the rail, a lever pivoted to said lug extending to either side thereof and provided at its rear side with a handle.

In testimony whereof I affix my signature in presence of two witnesses.

OLOF WESTLING.

Witnesses:
BERNICE G. BAUMANN,
HARRY D. KILGORE.